US006856355B1

(12) United States Patent
Ray et al.

(10) Patent No.: US 6,856,355 B1
(45) Date of Patent: Feb. 15, 2005

(54) METHOD AND APPARATUS FOR A COLOR SCANNERLESS RANGE IMAGE SYSTEM

(75) Inventors: Lawrence A. Ray, Rochester, NY (US); Louis R. Gabello, Rochester, NY (US); Kenneth J. Repich, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/451,823

(22) Filed: Nov. 30, 1999

(51) Int. Cl.[7] .................. H04N 5/222; G03B 15/03; G03B 13/00; G06K 9/00; G01C 3/08
(52) U.S. Cl. .................. 348/370; 396/109; 396/89; 396/106; 382/134; 356/5.04; 356/5.01
(58) Field of Search .................. 396/106, 89, 109; 382/154; 356/5.04, 5.01; 348/370

(56) References Cited

U.S. PATENT DOCUMENTS

| 4,307,940 | A | | 12/1981 | Hagedorn-Olsen .......... 350/254 |
| 4,935,616 | A | * | 6/1990 | Scott .................... 250/214 VT |
| 5,579,103 | A | | 11/1996 | Tachikawa |
| 5,754,280 | A | | 5/1998 | Kato et al. ................. 356/3.06 |
| 5,862,252 | A | * | 1/1999 | Yamamoto et al. ......... 382/154 |
| 6,057,909 | A | * | 5/2000 | Yahav et al. ............... 356/5.04 |
| 6,088,086 | A | * | 7/2000 | Muguira et al. ........... 356/5.15 |
| 6,118,946 | A | * | 9/2000 | Ray et al. ...................... 396/89 |
| 6,288,776 | B1 | * | 9/2001 | Cahill et al. ................. 356/5.1 |
| 6,445,884 | B1 | * | 9/2002 | Yahav ......................... 396/106 |

OTHER PUBLICATIONS

McGraw–Hill Dictionary of Scientific and Technical Terms, 3rd Edition, Parker, S., ed., McGraw–Hill Book Company, New York, 1984, p. 1203.
The Focal Encyclopedia of Photography, 3rd Edition, Stroebel, L. and Zakia, R., ed., Focal Press, Boston, 1993, p. 92.
Photographic Optics, Arthur Cox, 15th Revised Edition, Focal Press, London, 1974, p. 224.
PCT WO 97/01111 A (Yahav Gioral; Iddan Gavriel I (IL); 3DV Systems LTD (IL), Jan. 9, 1997.
"The Emerging Versatility of a Scannerless Range Imager" by John Sackos, Bart Bradley, Bob Nellums, and Carl Diegert. SPIE vol. 2748, pp. 47–60.
U.S. Appl. No. 09/342,370, Lawrence A. Ray et al. filed Jun. 29, 1999.

* cited by examiner

Primary Examiner—Wendy R. Garber
Assistant Examiner—James M. Hannett
(74) Attorney, Agent, or Firm—David M. Woods

(57) ABSTRACT

A color scannerless range imaging system comprises four component systems, including an illumination system, an image capture device, an optical assembly and a controller for interconnecting and controlling the component systems. The illumination system separately illuminates a scene with modulated and unmodulated illumination, while the image capture device is positioned in an optical path of the reflected illumination from the scene for capturing a plurality of images thereof, including (a) at least one image of the reflected modulated illumination, whereby the modulation of the reflected modulated illumination incorporates a phase delay corresponding to the distance of objects in the scene from the range imaging system, and (b) at least one color image of the reflected unmodulated illumination. The optical assembly includes a first optical system for imaging a color image of unmodulated illumination from the scene and a second optical system including a modulating stage for modulating the reflected modulated illumination from the scene and generating an interference image representative of range information of the scene. The controller selectively places each of the optical systems in the optical path of the image capture device whereby both range information and color information of the scene are captured.

23 Claims, 6 Drawing Sheets

METHOD AND APPARATUS FOR A COLOR SCANNERLESS RANGE IMAGE SYSTEM

FIELD OF THE INVENTION

The invention relates generally to the field of three-dimensional image capture and in particular to the capture of three-dimensional image information with a scannerless range imaging system.

BACKGROUND OF THE INVENTION

Standard image capture systems will capture images, such as photographic images, that are two-dimensional representations of the three-dimensional world. In such systems, projective geometry best models the process of transforming the three-dimensional real world into the two-dimensional images. In particular, much of the information that is lost in the transformation is in the distance between the camera and image points in the real world. Methods and processes have been proposed to retrieve or record this information. Some methods, such as one based on a scanner from Cyberware, Inc., use a laser to scan across a scene. Variations in the reflected light are used to estimate the range to the object. However, these methods require the subject to be within 2 meters of the camera and are typically slow. Stereo imaging is a common example of another process, which is fast on capture but requires solving the "correspondence problem", that can be difficult and limit the number of pixels having range data, due to limited feature points.

Another method described in U.S. Pat. No. 4,935,616 uses a scanner-less laser range imaging system to illuminate a scene object with an amplitude modulated laser source. In this patent, the image capture portion of the system includes an image intensifier (in particular, a micro-channel plate) that is connected to modulate the optical signal reflected from the scene object. The distance-related phase shift of the intensity modulation reflected from the scene object can be determined by capturing two images. A first image is captured without modulating the optical signal, and a second image is captured with the received optical signal modulated by the micro-channel plate in phase with the same amplitude modulated frequency as used to modulate the laser source. Both captured images are registered spatially, and the relationship between them is a function of the range to the object in the scene. Once the phase shift has been established, range to the object can be recovered. The second image may be taken by phase shifting either the illumination modulation or the image intensifier modulation. After the images are acquired they are processed on a pixel-by-pixel basis to ascertain the range from the camera to the object for each pixel.

The preferred method of estimating the range in the '616 patent uses a pair of captured images, one image with a destructive interference caused by modulating the image intensifier, and the other image with the image intensifier set at a constant voltage. However, a more stable estimation method uses a series of at least three images, each with modulation applied to the image intensifier as described in commonly assigned U.S. Pat. No. 6,118,946, to Lawrence Allen Ray and Timothy P. Mathers. In that application, the distinguishing feature of each image is that the phase of the image intensifier modulation for each image is unique relative to modulation of the illuminator. If a series of n images are to be collected, then the preferred arrangement is for successive images to have a phase shift of $\frac{2\pi}{n}$ radians (where n is the number of images) from the phase of the previous image. However, this specific shift is not required, albeit the phase shifts need to be unique. The resultant set of images is referred to as an image bundle. The range at a pixel location is estimated by selecting the intensity of the pixel at that location in each image of the bundle and performing a best fit of a sine wave of one period through the points. The phase of the resulting best-fitted sine wave is then used to estimate the range to the object based upon the wave-length of the illumination frequency.

A drawback of methods based on the '616 patent is that color information is lost. Unfortunately for color applications, an image intensifier operates by converting photonic energy into a stream of electrons, amplifying the energy of the electrons and then converting the electrons back into photonic energy via a phosphor plate. One consequence of these conversions is that color information is lost. Since color is a useful property of images for many applications, a means of acquiring the color information that is registered along with the range information is extremely desirable.

The system described in the '616 patent may be implemented in relation to a normal camera system; in particular, a standard camera system may be converted into a range capture system by modifying its optical system. The camera may operate as either as a digital camera or a camera utilizing film. In the case of a film based system there are some other requirements that need to be met. These requirements and means for satisfying them are described in the aforementioned copending application Ser. No. 09/342,370, entitled "Method and Apparatus for Scannerless Range Image Capture Using Photographic Film". As mentioned above, the drawback of such a camera system is its inability to capture a color image. What is needed is a convenient camera system that can capture ranging information without sacrificing the color information that it would otherwise capture.

SUMMARY OF THE INVENTION

It is an object of the invention to provide a scannerless range imaging system that is capable of capturing both range images and color images of a scene.

The present invention is directed to overcoming one or more of the problems set forth above. Briefly summarized, according to one aspect of the present invention, a color scannerless range imaging system for generating images of a scene comprises an illumination system for controllably illuminating the scene with modulated illumination, whereby some of the modulated illumination is reflected from objects in the scene; an image capture device positioned in an optical path of the reflected illumination from the scene for capturing a plurality of images thereof, including (a) at least one image of the reflected modulated illumination, whereby the modulation of the reflected modulated illumination incorporates a phase delay corresponding to the distance of objects in the scene from the range imaging system, and (b) at least one color image of reflected unmodulated illumination; and means for storing the plurality of images as a bundle of associated images.

According to another aspect of the invention, a camera system for color scannerless range imaging comprises four component systems, including an illumination system, an image capture device, an optical assembly and a controller for interconnecting and controlling the component systems. The illumination system separately illuminates a scene with modulated illumination, while the image capture device is positioned in an optical path of the reflected illumination from the scene for capturing a plurality of images thereof, including (a) at least one image of the reflected modulated illumination, whereby the modulation of the reflected modulated illumination incorporates a phase delay corresponding to the distance of objects in the scene from the range imaging system, and (b) at least one color image of reflected unmodulated illumination. The optical assembly includes a first optical system for imaging a color image of unmodulated illumination from the scene and a second optical system including a modulating stage for modulating the reflected modulated illumination from the scene and generating an interference image representative of range information of the scene. The controller selectively places each of the optical systems in the optical path of the image capture device whereby both range information and color information of the scene are captured.

In a further aspect, the illumination system additionally produces unmodulated illumination for illuminating the scene and producing at least in part the reflected unmodulated illumination captured by the image capture device as the color image.

The advantage of the present invention is that it provides a means of obtaining a color image along with range information for each point on the image. Besides using a scannerless range image capture method, which is rapid and operative over a longer range than other methods, the invention includes a dual illuminating system and means for interchanging optical elements rapidly and simply so that both range and color information may be efficiently captured under the best illuminating conditions for each capture. The ability to accomplish this is provided in part by having the range capture system embodied as a camera attachment, e.g., on a lens turret, that is optically coupled with the image capture device.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because range imaging devices employing laser illuminators and capture devices including image intensifiers and electronic sensors are well known, the present description will be directed in particular to elements forming part of, or cooperating more directly with, apparatus in accordance with the present invention. Elements not specifically shown or described herein may be selected from those known in the art. Certain aspects of the embodiments to be described may be provided in software. Given the system as described in the following materials, all such software implementation needed for practice of the invention is conventional and within the ordinary skill in such arts.

Figure 8:
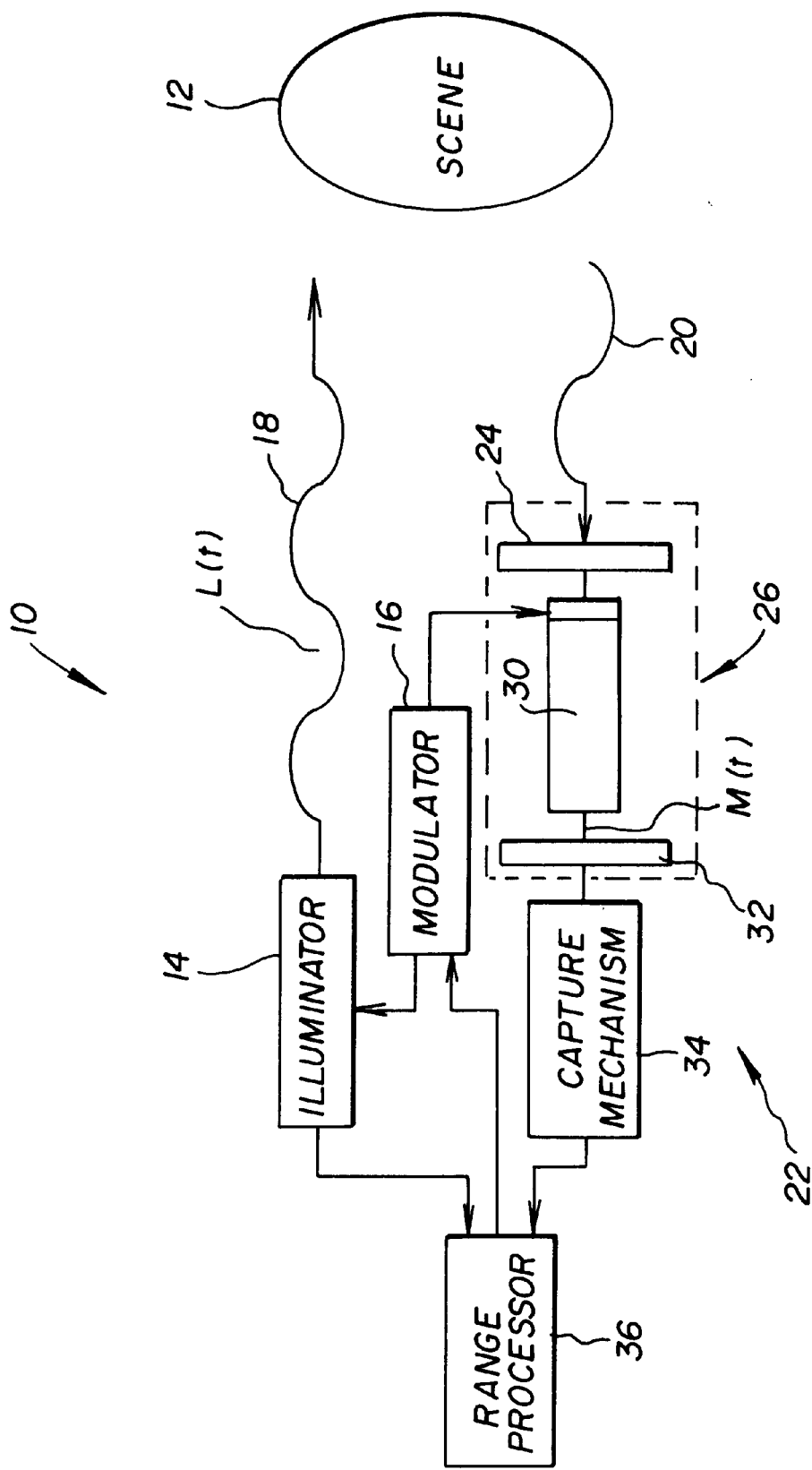
FIG. 8 is a block diagram of a range imaging system which can be used to capture a bundle of images.

It is helpful to first review the principles and techniques involved in scannerless range imaging, particularly in connection with the capture of image bundles in accordance with the aforementioned U.S. Pat. No. 6,118,946, to Lawrence Allen Ray and Timothy P. Mathers. Accordingly, referring first to FIG. 8, an range imaging system 10 is shown as a laser radar that is used to illuminate a scene 12 and then to capture an image bundle comprising a minimum of three images of the scene 12. An illuminator 14 emits a beam of electromagnetic radiation whose frequency is controlled by a modulator 16. Typically the illuminator 14 is a laser device which includes an optical diffuser in order to effect a wide-field illumination. It is preferable that the modulating laser is an IR source. This is for eye-safety issues and to operate in the spectral region of maximal response by the capture system. The modulator 16 provides an amplitude varying sinusoidal modulation. The modulated illumination source is modeled by:

$$L(t)=\mu_L+\eta \sin(2\pi\lambda t) \qquad (Eq. 1)$$

where $\mu_L$ is the mean illumination, $\eta$ is the modulus of the illumination source, and $\lambda$ is the modulation frequency applied to the illuminator 14. The modulation frequency is sufficiently high (e.g., 10 MHz) to attain sufficiently accurate range estimates. The output beam 18 is directed toward the scene 12 and a reflected beam 20 is directed back toward a receiving section 22. As is well known, the reflected beam 20 is a delayed version of the transmitted output beam 18, with the amount of phase delay being a function of the distance of the scene 12 from the range imaging system. The reflected beam 20 is sensed by a photocathode 24, which converts its amplitude variations into a modulated electron stream that strikes an image intensifier 26. Since the photocathode 24 does not separately process the colors in the scene, the electron stream created at this point is essentially monochromatic, i.e., the color information is lost at this time. The output of the image intensifier 26 is modeled by:

$$M(t)=\mu_M+\gamma \sin(2\pi\lambda t) \qquad (Eq. 2)$$

where $\mu_M$ is the mean intensification, $\gamma$ is the modulus of the intensification and $\lambda$ is the modulation frequency applied to the intensifier 26. The purpose of the image intensifier is not only to intensify the image, but also to act as a modulating shutter. Accordingly, the image intensifier 26 is connected to the modulator 16, such that the electron stream strikes the intensifier 26 and is modulated by a modulating signal from the modulator 16. The modulated electron stream is then amplified through secondary emission by a microchannel plate 30. The intensified electron stream bombards a phosphor screen 32, which converts the energy into a visible light image. The intensified light image signal is captured by a capture mechanism 34, such as a charge-coupled device (CCD). The captured image signal is applied to a range processor 36 to determine the phase delay at each point in the scene. The phase delay term ω of an object at a range ρ meters is given by:

$$\omega = \frac{2\rho\lambda}{c} \bmod 2\pi \qquad (Eq.\ 3)$$

where c is the velocity of light in a vacuum. Consequently, the reflected light at this point is modeled by:

$$R(t)=\mu_L+\kappa\ \sin(2\pi\lambda t+\omega) \qquad (Eq.\ 4)$$

where κ is the modulus of illumination reflected from the object. The pixel response P at this point is an integration of the reflected light and the effect of the intensification:

$$P = \int_0^{2\pi} R(t)M(t)\,dt = 2\mu_L\mu_M\pi + \kappa\pi\gamma\cos(\omega) \qquad (Eq.\ 5)$$

In the range imaging system disclosed in the aforementioned '616 patent, a reference image is captured during which time the micro-channel plate is not modulated, but rather kept at a mean response. In that case, equation (5) fundamentally is unchanged, though M(t) is now simply a constant $\mu_M$. The range is estimated for each pixel by recovering the phase term as a functions of the value of the pixel in the reference image and the phase image. There are several reasons why this approach is not robust. Included in this is the fact that the analysis depends upon continuous values. The range estimation is based upon the portion of the phase image relative to the reference image. For digital systems the relative quantization of the phase image to the reference image decreases as the response of the reference image decreases. The system is also somewhat noise sensitive.

A robust approach which overcomes the limitations of the method proposed in the '616 patent is described in the aforementioned U.S. Pat. No. 6,118,946, which is incorporated herein by reference. Instead of collecting a phase image and a reference image, the improved approach collects at least three phase images (referred to as an image bundle). In the previous approach, the intensifier 26 and the laser illuminator 14 were phase locked. The improved approach shifts the phase of the intensifier 26 relative to the phase of the illuminator 14, and each of the phase images has a distinct phase offset. For this purpose, the range processor 36 is suitably connected to control the phase offset of the modulator 16, as well as the average illumination level and such other capture functions as may be necessary. If the image intensifier 26 (or laser illuminator 14) is phase shifted by $\theta_i$, the pixel response from equation (5) becomes:

$$P_i=2\mu_L\mu_M\pi+\kappa\pi\gamma\ \cos(\omega+\theta_i) \qquad (Eq.\ 6)$$

It is desired to extract the phase term ω from the expression. However, this term is not directly accessible from a single image. In equation (6) there are three unknown values and the form of the equation is quite simple. As a result, mathematically only three samples (from three images) are required to retrieve an estimate of the phase term, which is equivalent to the distance of an object in the scene from the imaging system 10. Therefore, a set of three images captured with unique phase shifts is sufficient to determine ω. For simplicity, the phase shifts are given by $\theta_k=2\pi k/3$; k=0,1,2. In the following description, an image bundle shall be understood to constitute a collection of images which are of the same scene, but with each image having a distinct phase offset obtained from the modulation applied to the intensifier 26. It should also be understood that an analogous analysis may be performed by phase shifting the illuminator 14 instead of the intensifier 26. If an image bundle comprising more than three images is captured, then the estimates of range can be enhanced by a least squares analysis using a singular value decomposition (see, e.g., W. H. Press, B. P. Flannery, S. A. Teukolsky and W. T. Vetterling, *Numerical Recipes (the Art of Scientific Computing)*, Cambridge University Press, Cambridge, 1986).

If images are captured with n≧3 distinct phase offsets of the intensifier (or laser or a combination of both) these images form an image bundle. Applying Equation (6) to each image in the image bundle and expanding the cosine term (i.e., $P_i=2\mu_L\mu_M\pi+\kappa\pi\gamma(\cos(\omega)\cos(\theta_i)-\sin(\omega)\sin(\theta_i))$) results in the following system of linear equations in n unknowns at each point:

$$\begin{pmatrix} P_1 \\ P_2 \\ \vdots \\ P_n \end{pmatrix} = \begin{pmatrix} 1 & \cos\theta_1 & -\sin\theta_1 \\ 1 & \cos\theta_2 & -\sin\theta_2 \\ \vdots & \vdots & \vdots \\ 1 & \cos\theta_n & -\sin\theta_n \end{pmatrix} \begin{pmatrix} \Lambda_1 \\ \Lambda_2 \\ \Lambda_3 \end{pmatrix} \qquad (Eq.\ 7)$$

where $\Lambda=2\mu_L\mu_M\pi$, $\Lambda_2=\kappa\pi\gamma\ \cos\ \omega$, and $\Lambda_3=\kappa\pi\gamma\ \sin\ \omega$. This system of equations is solved by a singular value decomposition to yield the vector $\Lambda=[\Lambda_1, \Lambda_2, \Lambda_3]^T$. Since this calculation is carried out at every (x,y) location in the image bundle, Λ is really a vector image containing a three element vector at every point. The phase term ω is computed at each point using a four-quadrant arctangent calculation:

$$\omega=\tan^{-1}(\Lambda_3, \Lambda_2) \qquad (Eq.\ 8)$$

The resulting collection of phase values at each point forms the phase image. Once phase has been determined, range r can be calculated by:

$$r = \omega\frac{c}{4\pi\lambda} \qquad (Eq.\ 9)$$

Equations (1)–(9) thus describe a method of estimating range using an image bundle with at least three images (i.e., n=3) corresponding to distinct phase offsets of the intensifier and/or laser.

Figure 1:
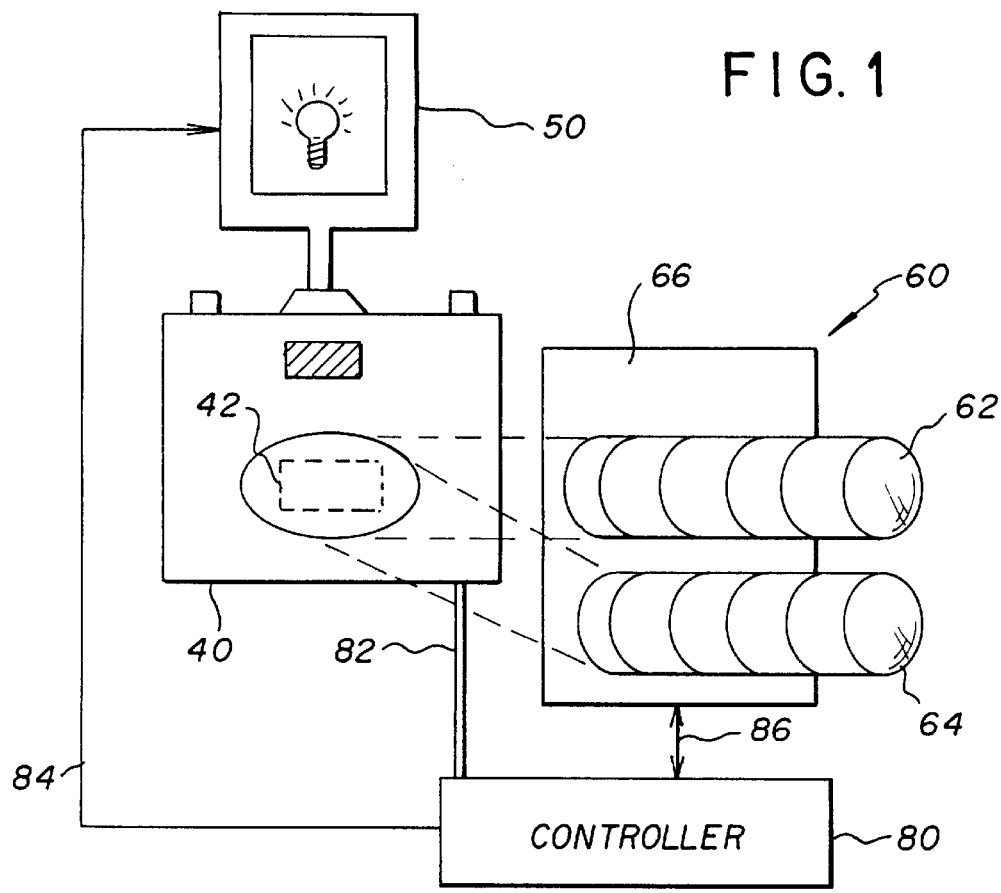
FIG. 1 shows the main components of a color scannerless range imaging system in accordance with the invention.

Referring now to FIG. 1, the overall color scannerless range imaging system is shown to comprise four main components in accordance with the present invention. The first component is an image capture device 40 for capturing an image. This may be, for example, a camera body where an image capture element 42 might be either a photosensitive film or an electronic sensor, such as a charged-coupled-device. This device 40 is able to capture a plurality of images. Moreover, a remote trigger line 82 is provided for signaling the image capture device 40. Also, a means for advancing, or driving, the image capture device 40 to prepare for a successive image capture must be available. Such capabilities are well known in relation to such image capture devices, and will not be described in detail. The second component is an illumination system 50 for producing high-frequency amplitude modulated illumination of a desired average amplitude, amplitude modulus and frequency. It is also desirable that the illumination system 50 further includes the capability of shifting the phase of the amplitude modulation between a set of prescribed phase offsets (alternatively, this function may be performed by modulation of the reflected illumination in the capture portion of the color scannerless range imaging system). It is also useful for the illumination system 50 to have a preferred operating wavelength. The third component is an optical assembly 60 comprised of two optical elements 62 and 64 and a component 66 (such as, will be seen, a lens turret) for interchanging the optical elements 62 and 64 in front of the image capture device 40. The two optical elements 62 and 64 have different purposes, but both share the same gross optical properties, such as focal length, aperture and field of view. A controller 80 manages the overall image capture process of the image and range capture system, including the operation of the illumination system 50, the image capture device 40, and the optical assembly 60. For instance, the controller 80 may include the remote trigger line 82 for causing the image capture device 40 to initiate an image capture sequence, and an illumination control line 84 for causing the illumination system 50 to emit the correct illumination at the correct moment. It is preferred, but not mandatory, that the controller 80 automatically operates the component 66, via an optics control line 86, to change the optical elements 62 and 64 as needed for operation according to the invention.

Figure 2:
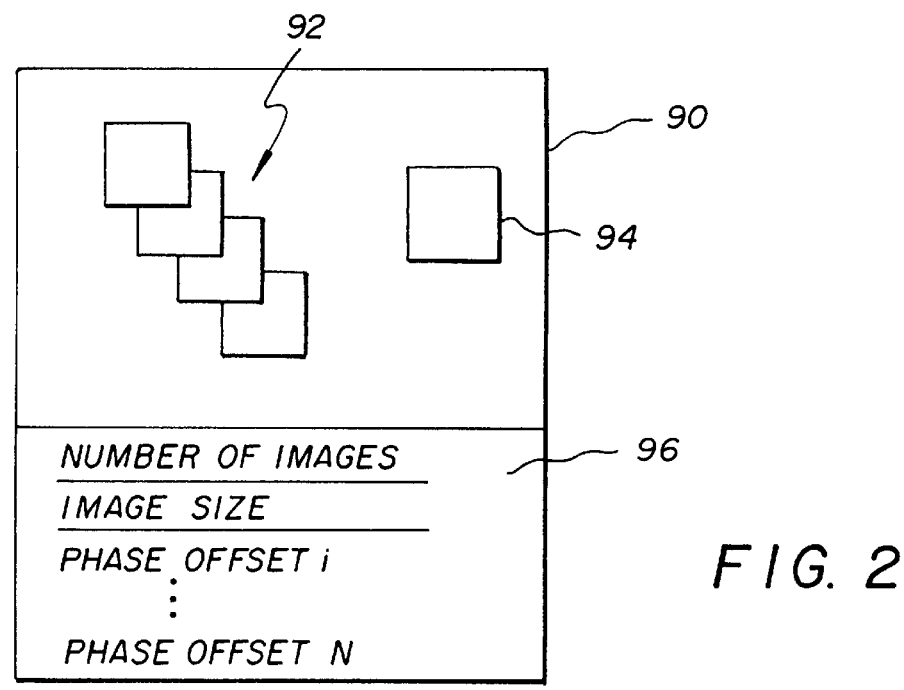
FIG. 2 is a diagram illustrating an image bundle and related data captured by the system shown in FIG. 1.

As shown in relation to FIG. 2, the notion of an image bundle 90 is central to the range estimation method. The image bundle 90 includes a combination of images captured by the system as well as information pertinent to the individual images and information common to all the images. The image bundle contains two types of images: range images 92 related to the range capture portion of the process and a color image 94, commonly referred to as a texture image. Common information 96 in the image bundle 90 would typically include the number of images in the bundle (three or more) and the modulation frequency utilized by the camera system. Other information might be the number of horizontal and vertical pixels in the images and/or data related to camera status at the time of the image capture. Image specific information will include the phase offset 1 . . . N used for each (1 . . . N) of the individual range images 92. The image bundle 90 includes a minimum of three such images, each of which are monochrome. Each of the range images 92 records the effect of a distinct phase offset applied to either the illumination system 50 or to elements of the optical assembly 60. The additional color image 94 is an image using the optical element 62 that does not contain range capture components. Although this is a color image, it is preferably, but not necessarily, the same size as the range images 92.

Figure 3:
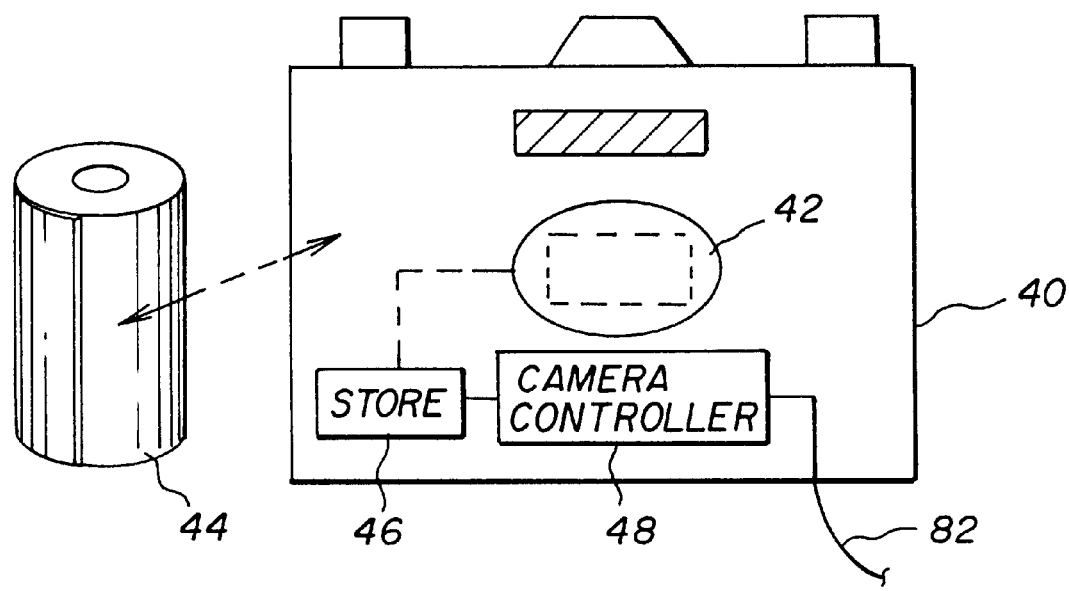
FIG. 3 is a diagram showing more detail of the image capture device shown in FIG. 1.

The image capture device 40 shown in FIG. 3 shares many aspects of a standard camera body (except that, in this embodiment, image capture is initiated from the controller 80). For the purpose of the present invention, the image capture element 42 is enabled to capture color images. In the case of a digital image capture device, the capture element 42 (e.g., a charge-coupled device) is covered with a color-filter-array (not shown) for generating a color image, and in the case of a film image capture system a color film is used and a method of introducing fiducial markings on the film is preferred for registration. The image capture system requires image storage means to store all range images 92 in the image bundle 50, as well as a color texture image 94 in addition to the range images 92. This can be accomplished by an on-camera storage means, such as a photosensitive film 44 with multiple image frames or a digital storage mechanism 46, such as an internal memory together with output connections to, e.g., a PCMCIA card or a floppy disk (not shown) for receiving images from the internal memory. A camera controller 48 connected to the remote trigger line 82 accepts trigger signals and causes the image capture device 40 to capture an image. Once an image is recorded the image capture device 40 must automatically prepare for an additional image capture. In the case of a film based image capture system, an automatic film advance (not shown) is activated by the camera controller 48. In the case of a digital camera, the camera controller 48 stores the image bundle data onto the digital storage mechanism 46 and clears internal buffers (not shown) for a subsequent image capture.

Figure 4:
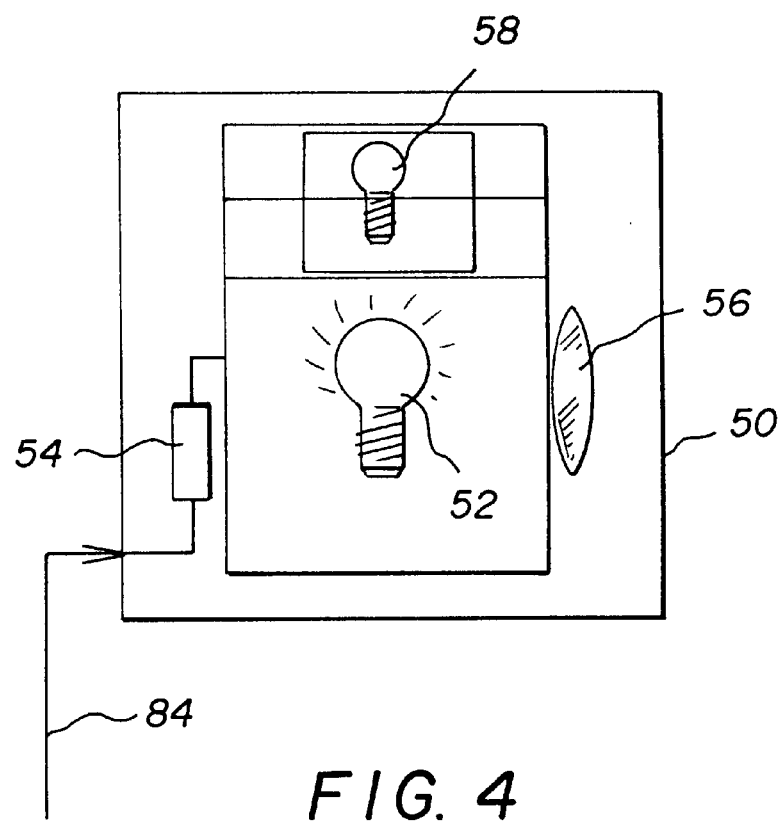
FIG. 4 is a diagram showing more detail of the illumination system shown in FIG. 1.

The illumination system 50 shown in FIG. 4 has the primary purpose of producing amplitude-modulated illumination with its phase controllable for generating a shift in the transmitted wave pattern for each range image in the image bundle (although, as mentioned before, this function may be performed by modulation of the reflected illumination in the capture portion of the color scannerless range imaging system). The illumination system 50 includes a light source, which is preferably a laser light source 52 with an intensity of about 0.5 watt, and a modulation circuit 54 controllable through line 84 from the controller 80, for generating the requisite modulation signals of predetermined frequency with a set of predetermined phase offsets. The laser light source 52 is preferably modulated at a modulation frequency of about 12.5 megahertz and the preferred phase offsets, as mentioned earlier, are phase shifts θ in each range image given by $\theta_k = 2\pi k/3$; k=0,1,2. The preferred wavelength of the laser light is about 830 nm, as this wavelength provides an optimal balance between concerns for eye-safety and for the typical response of one or more of the optical elements 62 and 64 described below. Although the laser light need not necessarily be uniformly distributed, a diffusion lens 56 is positioned in front of the laser light source 52 in order to spread the modulated light across the desired field of view as uniformly as possible.

The illumination system 50 also includes a standard wide-band illumination system 58 that is not modulated. This illumination source is used for normal photographic images. This device 58 may be a commonly known and understood flash of a standard camera system, e.g., a commonly available electronic flash of the type useful with photographic cameras. The illumination system 50 is connected via the control line 84 to the controller 80, which directs the illumination system 50 to operate in either of the following modes: a) a first mode in which the laser is operated to illuminate the scene with a plurality (bundle) of exposures, each with a unique phase offset applied to its modulating frequency; and b) a second mode in which the standard wide-band illumination system 58 is turned on and the flash is initiated by the controller during capture of the color texture image. If ambient light is sufficient, of course, it may be unnecessary for the illumination system 50 to operate in the second mode in order to capture a color image; in that case, the image capture device would be instructed to operate without flash. Moreover, the sequence of image capture may be reversed, that is, the second mode may be engaged before the first mode or, indeed, the second mode might in specific situations be engaged between the several exposures of the first mode. The illumination system 50 also communicates with the controller 40 via the line 84 to indicate that all systems are ready for use.

Figure 5:
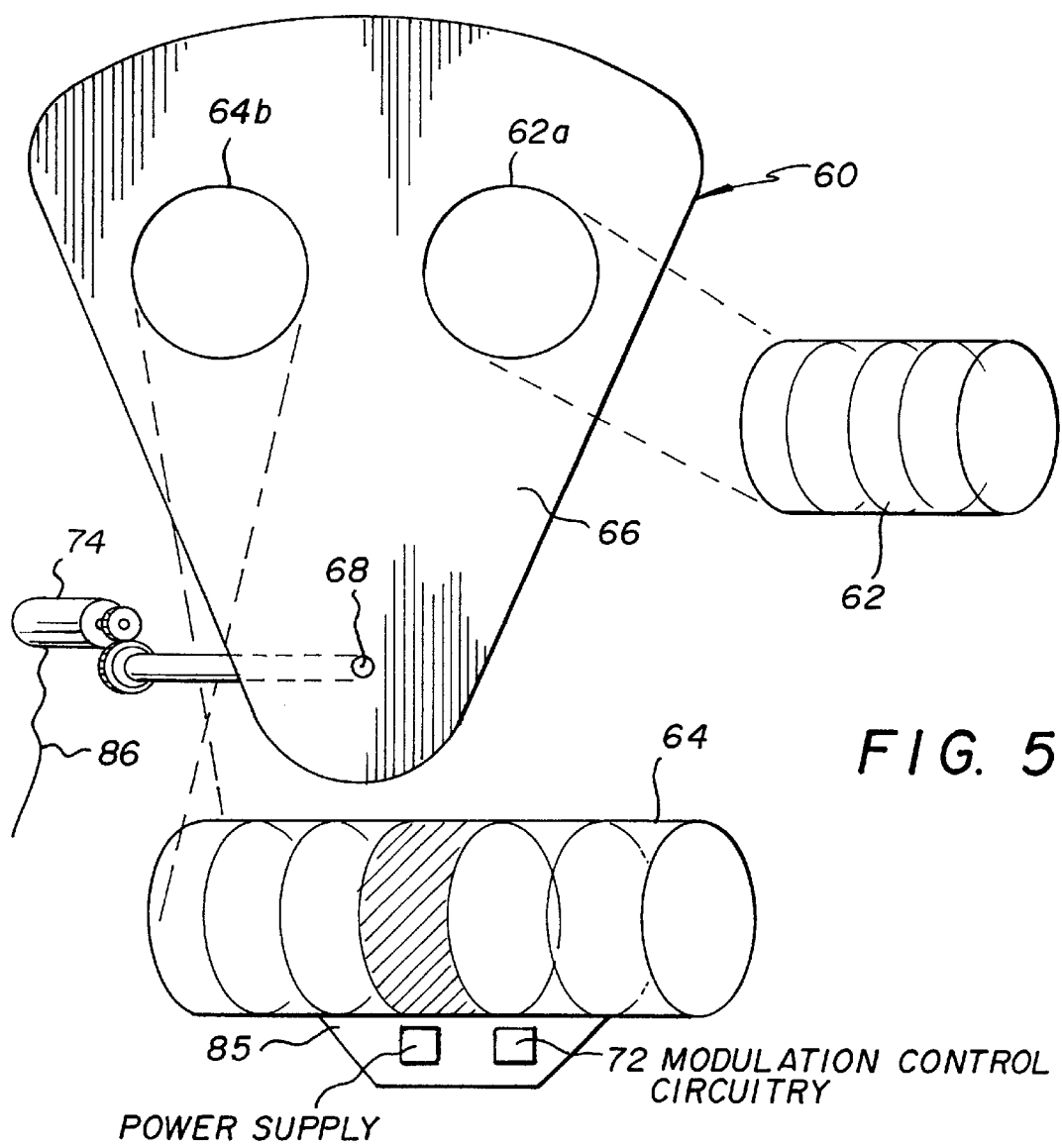
FIG. 5 is a diagram showing more detail of the optical assembly shown in FIG. 1.

Referring to FIG. 5, the optical assembly 60 includes a lens turret 66 for supporting the primary optical elements 62 and 64 in relation to the image capture device 40. (The optical elements 62 and 64 are shown in FIG. 5 removed from their threaded lens openings 62a and 64a in the lens turret 66.) The turret 66 is movable about a pivot 68 interconnected with the image capture device 40 for placing a selected one of the optical elements 62 and 64 in an optical path of the image capture element 42. These optical elements 62 and 64 share as many optical properties as practicable, such as focal length, distortion, field of view, and aperture. The first optical element 62 is a standard optical element as conventionally found on a large number of camera systems for imaging a scene on the image capture element 42. The alternative optical element 64 contains components to enable the range capture, thereby imaging the bundle of phase interference patterns on the image capture element 42. Such components would include the image intensifier 26 shown in FIG. 8 (including the photocathode 24, the microchannel 30 and the phosphor screen 32), as well as a power supply 70 and modulation control circuitry 72 (which may be a part of the modulator 16 shown in FIG. 8). The intensifier 26 is triggered by an intensifier control line 85 connected to the controller 80, which drives the power supply 70 and cycles the modulation control circuitry 72 for each range image capture. As alluded to earlier, the modulation control circuitry 72 in the optical element 64 may optionally produce amplitude-modulated illumination with its phase controllable for generating the before-mentioned phase shift (i.e., with preferred phase shifts, as mentioned earlier, given by $\theta_k=2\pi k/3$; k=0,1,2) in the transmitted wave pattern for each range image in the image bundle.

The lens turret 66 in the optical assembly 60 permits either of the two optical elements 62 and 64 to be placed in line with the optical axis of the image capture device 40. Such a turret housing is well known and its construction will not be described in detail, e.g., optical systems having multiple conventional lenses on a turret are well known in the motion picture industry. For instance, the disclosure of U.S. Pat. No. 4,307,940, which is incorporated herein by reference, is an example of such a system in a reproduction camera. These systems permit the operator to easily shift between a plurality of lenses without having to detach and re-attach a lens. Advantages of such a system is the ease and speed of interchanging optical elements, as well as maintaining the position of the camera during the interchange of optical elements. It is preferable, but not required, that the ability to pivot the turret 66 be accomplished automatically without the need of the operator to physically cause the elements to be interchanged. In such case, a motor 74 is operated by direction of the controller 80 for rotating the turret 66 between its two optical positions. Given the position of the motor shaft, the optical assembly 60 signals the controller 80 via the optics control line 86 regarding the current position of the optical assembly 60.

Figure 6:
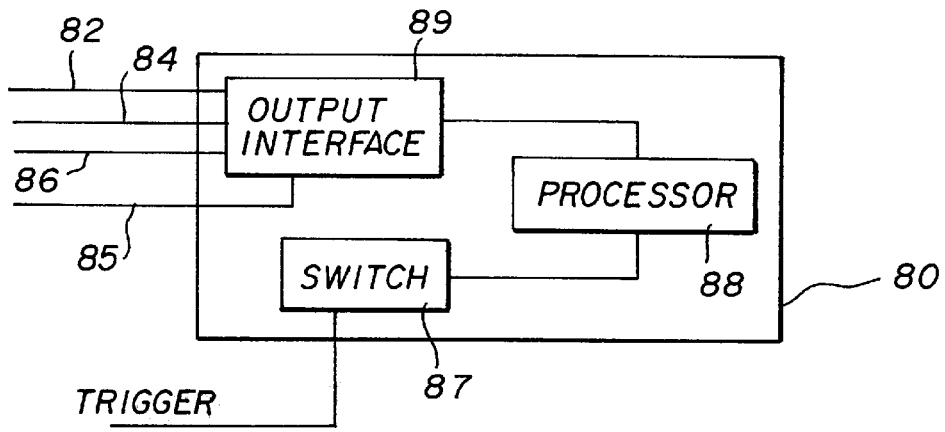
FIG. 6 is a diagram showing more detail of the controller shown in FIG. 1.

Referring to FIG. 6, the main purpose of the controller 80 is in sequencing and otherwise controlling the operation of the components of the color scannerless range imaging system to capture the image bundle 90 shown in FIG. 2. The controller 80 is shown to include a processor 87, a switch 88 and an output interface 89. More particularly, the processor 87 determines the current state of image collection to complete an image bundle 90 and, if another image is needed, establishes the parameters for the next successive image in the image bundle. The processor 87 communicates via the interface 89 and the remote trigger line 82 with the image capture device 40 to activate the image capture element 42 and capture an image. This function is initiated by the switch 88 in the controller 80, which connects a user controlled trigger signal to the processor 87. The controller 80 also communicates via the interface 89 with the illumination system 50 through the control line 84. During all of this activity, the controller 80 maintains the capture status of the image bundle 90. If a range image 92 contained in the image bundle 90 is set to be captured, then the controller 80 signals the optical assembly 60 via the optics control line 86 to align the optical element 64 with the optical path of the image capture device 40. If the range images 92 in the bundle 90 are complete and a color texture image 94 is required, then the controller 80 signals the optical assembly 60 to position itself such that alternative optical element 62 is in the optical path of the image capture device 40.

Figure 7:
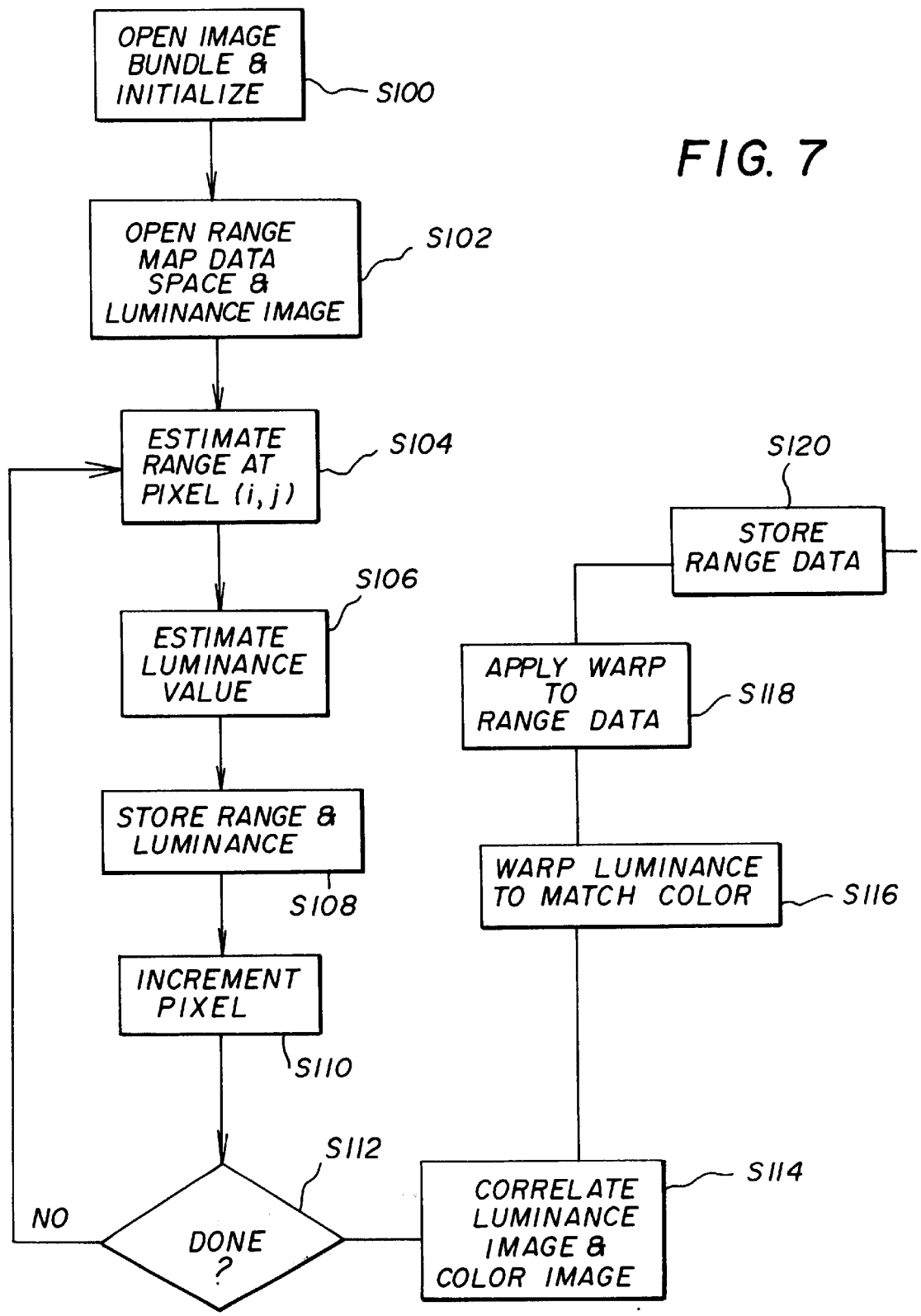
FIG. 7 is a diagram of the steps involved in processing image and range information in accordance with the invention.

The processing of the image bundle 90 is described in FIG. 7. The range images 92 of the bundle 90 and the color texture image 94 are combined to form a color image with a dense set of range values, that is, where range values are associated with a preponderance of, or all, image pixel locations. The range images 92 contained in the image bundle 90 are used to determine the range estimates for each pixel in the image. The process begins with the opening of the image bundle (S100), and the initializing of internal parameters, including the number of range images, the number of pixels to be processed and the modulation frequency of the camera system. A processing loop is then entered that operates on the image in a pixel-wise fashion. After the range map is opened (S102), the first step is to estimate the range (S104) for the (i,j)th pixels. For each pixel location (i,j), the range is estimated by sampling each range image at its (i,j)th pixel location and performing the aforementioned calculation. The pixel intensity values and the phase offset used in producing the image in the image bundle are matched. The aforementioned equations (1)–(9) describe a method of estimating range using an image bundle with at least three images corresponding to distinct phase offsets of the intensifier and/or laser. Moreover, it is well known that there is a sinusoidal relationship between the intensity values and the phase offset. By fitting the data to a sine-wave of the form $\alpha+\beta \sin(\phi+\omega)$ then the range can be estimated. As a by-product of this estimate, an estimate of the luminance value (S106) of the pixel is obtained. By performing these operations the estimated luminance value and the estimated range at the (i,j)th pixel is obtained and stored (S108). The pixel location is incremented (S110) and if all pixels are processed (S112) then the loop is exited. Otherwise the next pixel is processed in the same manner.

A full color image 94 is acquired when the alternative optical element 62 is aligned with the optical path of the image capture device 40. The luminance image estimated above and the color image need to be correlated (S114). There are many approaches to accomplish this task, e.g., refer to *The Image Processing Handbook*, $2^{nd}$ ed., by John C. Russ, CRC Press, 1995, pp. 332–336. These two images are then correlated (S114) in order to eliminate any distortions caused by subtle differences in the physical optics of the two lenses comprising the optical assembly 60. A warping of the luminance image (S116) to match the features of the color image is obtained. The warping is applied to the range data (S118) in order to match the range data with the color image features. Such warping techniques are described in *Digital Image Warping,* by G. Wolberg, *IEEE Computer Society Press,* 1990. The warped range image and the color image are combined and stored as a color image with range data (S120). It is preferred that the range data be stored as floating point values.

Figure 9:
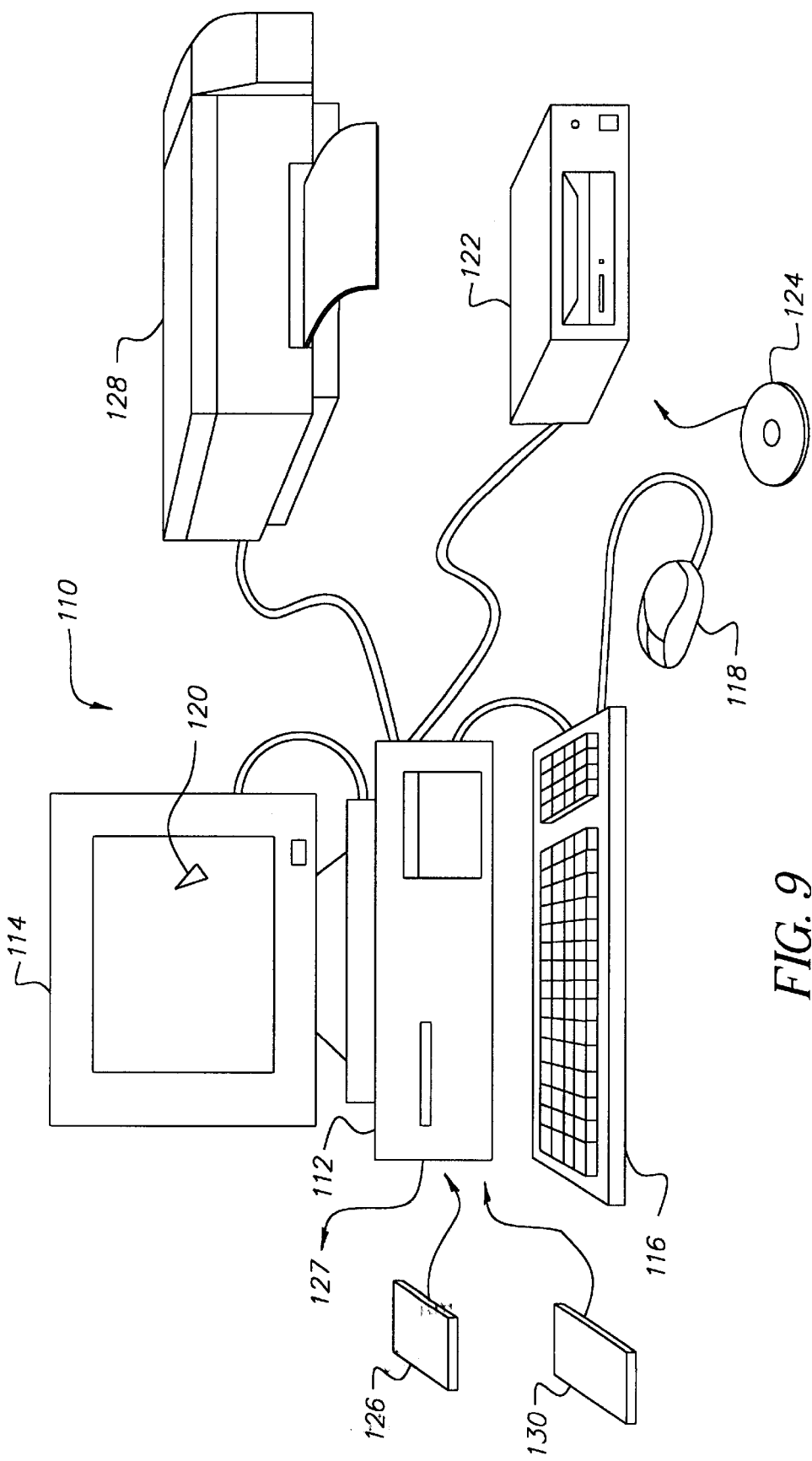
FIG. 9 is a perspective diagram of a computer system for implementing certain programs associated with the present invention.

The aforementioned processing of the image bundles 90 is preferably performed on any well-known computer system, such as the computer system shown in FIG. 9. It is also instructive to note that the images may be either directly input into the computer system from the color scannerless range imaging system (particularly if it is a digital capture system) or digitized before input into the computer system (for example by scanning an original, such as a silver halide film, if the imaging system is a film system). Referring to FIG. 9, there is illustrated a computer system 110 for implementing the programs associated with the present invention. Although the computer system 110 is shown for the purpose of illustrating a preferred embodiment, the present invention is not limited to the computer system 110 shown, but may be used on any electronic processing system. The computer system 110 includes a microprocessor-based unit 112 for receiving and processing software programs of the type illustrated in FIG. 7 and for performing other processing functions. A display 114 is electrically connected to the microprocessor-based unit 112 for displaying user-related information associated with the software, e.g., by means of a graphical user interface. A keyboard 116 is also connected to the microprocessor based unit 112 for permitting a user to input information to the software. As an alternative to using the keyboard 116 for input, a mouse 118 may be used for moving a selector 120 on the display 114 and for selecting an item on which the selector 120 overlays, as is well known in the art.

A compact disk-read only memory (CD-ROM) 122 is connected to the microprocessor based unit 112 for receiving software programs and for providing a means of inputting the software programs and other information to the microprocessor based unit 112 via a compact disk 124, which typically includes a software program. In addition, a floppy disk 126 may also include a software program, and is inserted into the microprocessor-based unit 112 for inputting the software program. Still further, the microprocessor-based unit 112 may be programmed, as is well known in the art, for storing the software program internally. The microprocessor-based unit 112 may also have a network connection 127, such as a telephone line, to an external network, such as a local area network or the Internet. A printer 128 is connected to the microprocessor-based unit 112 for printing a hardcopy of the output of the computer system 110.

Images may also be displayed on the display 14 via a personal computer card (PC card) 130, such as, as it was formerly known, a PCMCIA card (based on the specifications of the Personal Computer Memory Card International Association) which contains digitized images from the color scannerless range imaging system electronically embodied in the card 130. The PC card 130 is ultimately inserted into the microprocessor based unit 112 for permitting visual display of the image on the display 114. Images may also be input via the compact disk 124, the floppy disk 126, or the network connection 127. After the images have been processed in accordance with the steps shown in FIG. 7, the range data is stored together with color values, such as RGB data, for each image pixel. Such stored data may be accumulated for the entire image and written as a dense range map including color data onto the compact disk 124, the floppy disk 126, or the card 130, or communicated via the network connection 127.

These and other aspects, objects, features and advantages of the present invention will be more clearly understood and appreciated from a review of the following detailed description of the preferred embodiments and appended claims, and by reference to the accompanying drawings.

| PARTS LIST | |
|---|---|
| 10 | range imaging system |
| 12 | scene |
| 14 | illuminator |
| 16 | modulator |
| 18 | output beam |
| 20 | reflected beam |
| 22 | receiving section |
| 24 | photocathode |
| 26 | image intensifier |
| 30 | microchannel plate |
| 32 | phosphor screen |
| 34 | capture mechanism |
| 36 | range processor |
| 40 | image capture device |
| 42 | image capture element |
| 44 | film |
| 46 | digital storage mechanism |
| 48 | camera controller |
| 50 | illumination device |
| 52 | laser source |
| 54 | modulation circuit |
| 56 | diffusion lens |
| 58 | standard illumination source |
| 60 | optical assembly |
| 62 | optical element |
| 64 | optical element |
| 66 | lens turret |
| 68 | pivot |
| 70 | power supply |
| 72 | modulation control circuitry |
| 80 | controller |
| 82 | remote trigger |
| 84 | illumination control |
| 86 | optics control |
| 87 | switch |
| 88 | processor |
| 89 | output interface |
| 90 | image bundle |
| 92 | range images |
| 94 | color image |
| 96 | common information |
| 110 | computer system |
| 112 | microprocessor-based unit |
| 114 | display |
| 116 | keyboard |
| 118 | mouse |
| 120 | selector |
| 122 | CD-ROM |
| 124 | CD |
| 126 | floppy disk |
| 127 | network connection |
| 128 | printer |
| 130 | PC card |

What is claimed is:

1. A color scannerless range imaging system for generating images of a scene, said system comprising:
a illumination system for controllably illuminating the scene with modulated illumination, whereby some of the modulated illumination is reflected from objects in the scene; and
an image capture device positioned in an optical path of the reflected illumination from the scene for capturing a plurality of images thereof, including (a) at least one image of the reflected modulated illumination, whereby the modulation of the reflected modulated illumination incorporates a phase delay corresponding to the distance of objects in the scene from the range imaging system, and (b) at least one color image of reflected unmodulated illumination;
wherein the image capture system captures a plurality of images of the reflected modulated illumination, wherein each image incorporates the effect of a predetermined modulation frequency together with a phase offset unique for each image, and wherein each unique phase offset θ is given by $\theta_i = 2\pi i/3$; $i=0,1,2$.

2. The system as claimed in claim 1 further comprising means for storing the plurality of images as a bundle of associated images.

3. The system as claimed in claim 2 wherein the bundle of images is stored on a photographic film.

4. The system as claimed in claim 2 wherein the bundle of images include digital images stored on digital storage media.

5. The system as claimed in claim 1 wherein the illumination system includes a laser illuminator for producing the modulated illumination.

6. A color scannerless range imaging system for capturing light images reflected from a scene as color and range images, said system comprising:

first and second optical systems disposable, in alternation, to receive the light images, said first and second optical systems each having an optical lens, said second optical system having a modulating stage, said first optical system transmitting the received light images without modulation to provide unmodulated light images, said second optical system modulating and transmitting the received light images to provide modulated images;

an illumination system illuminating the scene with modulated illumination when said second optical system receives said light images, wherein said modulated images are interference images representative of range information of the scene; and an color image capture device disposed to capture said unmodulated and modulated light images.

7. The system as claimed in claim 6 wherein said image capture device includes an electronic imager having a color-filter-array.

8. The system as claimed in claim 6 wherein said image capture device includes color photographic film.

9. The system as claimed in claim 6 wherein said second optical system includes an image intensifier.

10. The system as claimed in claim 6 further comprising a turret holding said first and second optical systems.

11. The system as claimed in claim 10 further comprising a controller automatically swinging said turret to dispose said first and second optical systems, in alternation, to receive the light images.

12. The system as claimed in claim 6 wherein said first and second optical systems each have lenses, said lenses being of the same focal length, aperature, and field of view.

13. The system as claimed in claim 6 wherein said illumination system has a laser illuminator providing said modulated illumination and a flash lamp.

14. A method for capturing range and color images of a scene, said method comprising the steps of:

propagating a white light image of said scene through a first optical system to provide a first light image;

capturing said first light image with a color image capture device;

illuminating said scene with illumination modulated at a predetemined frequency to provide a reflected modulated light image;

modulating and intensifying said reflected modulated light image to provide an second light image representative of range information of the scene;

capturing said second light image with said color image capture device.

15. The method as claimed in claim 14 further comprising correlating said first and second light images.

16. The method as claimed in claim 15 further comprising iterating said illuminating; modulating and intensifying; and second capturing steps twice more, wherein said reflected modulated light images have different phase offsets.

17. The method as claimed in claim 14 wherein said capturing further comprises filtering said first and second images through a color filter array.

18. The method as claimed in claim 17 wherein said capturing further comprises filtering said first and second images through a color filter array.

19. A method for capturing range and color images of a scene, said method comprising the steps of:

switching a first optical system into an optical path and a second optical system out of said optical path;

following said switching, propagating a white light image of said scene, through said first optical system;

capturing said white light image with a color image capture device;

moving said second optical system into said optical path and said first optical system out of said optical path;

following said moving, illuminating said scene with illumination modulated at a predetemined frequency to provide a reflected modulated light image;

modulating said reflected modulated light image to provide an interference image representative of range information of the scene;

capturing said interference image with said color image capture device.

20. The method as claimed in claim 19 further comprising, during said modulating:

intensifying said interference image to provide an electron stream;

converting said electron stream into said interference image.

21. The method as claimed in claim 19 further comprising iterating said illuminating; following; and second capturing steps twice more, wherein said interference images have different phase offsets.

22. The method as claimed in claim 21 further comprising correlating said white light and interference images.

23. The method as claimed in claim 22 wherein said capturing further comprises filtering said images through a color filter array.

* * * * *

UNITED STATES PATENT AND TRADEMARK OFFICE
CERTIFICATE OF CORRECTION

PATENT NO. : 6,856,355 B1  
APPLICATION NO. : 09/451823  
DATED : November 30, 1999  
INVENTOR(S) : Lawrence A. Ray Page 1 of 1

It is certified that error appears in the above-identified patent and that said Letters Patent is hereby corrected as shown below:

ON THE TITLE PAGE OF THE PATENT AND IN THE SPECIFICATION

In item 54, and in column 1, line 2, delete "IMAGE" and insert -- IMAGING --

Signed and Sealed this

Fourth Day of November, 2014

Michelle K. Lee  
*Deputy Director of the United States Patent and Trademark Office*